(12) United States Patent
Azam et al.

(10) Patent No.: US 10,574,061 B2
(45) Date of Patent: *Feb. 25, 2020

(54) SMART BAG

(71) Applicant: Hewlett-Packard Development Company, L.P., Spring, TX (US)

(72) Inventors: Syed S. Azam, Tomball, TX (US); Kent E. Biggs, Tomball, TX (US); Robert C. Brooks, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,416

(22) Filed: Aug. 27, 2019

(65) Prior Publication Data

US 2019/0386495 A1 Dec. 19, 2019

Related U.S. Application Data

(63) Continuation of application No. 15/522,494, filed as application No. PCT/US2015/012959 on Jan. 26, 2015, now Pat. No. 10,439,403.

(51) Int. Cl.
| | |
|---|---|
| *H02J 7/00* | (2006.01) |
| *A45F 4/02* | (2006.01) |
| *G06F 9/06* | (2006.01) |
| *A45C 11/00* | (2006.01) |

(52) U.S. Cl.
CPC ............. *H02J 7/0008* (2013.01); *A45F 4/02* (2013.01); *G06F 9/06* (2013.01); *H02J 7/0044* (2013.01); *H02J 7/0054* (2013.01); *A45C 2011/002* (2013.01)

(58) Field of Classification Search
CPC ...... H02J 7/35; H02J 7/355; H02J 7/34; H02J 7/0021; H02J 7/027; H02J 7/0047; H02J 2007/0049; H02J 2007/005
USPC ......................................... 320/138, 134, 136
See application file for complete search history.

(56) References Cited

U.S. PATENT DOCUMENTS

| | | | |
|---|---|---|---|
| 3,734,282 | A | 5/1973 | Rebold |
| 8,397,310 | B2 | 3/2013 | Parris et al. |
| 8,823,319 | B2 | 9/2014 | Von Novak, III et al. |
| 10,439,403 | B2 * | 10/2019 | Azam ....................... G06F 9/06 |
| 2006/0061546 | A1 | 3/2006 | Jong |

(Continued)

FOREIGN PATENT DOCUMENTS

| | | |
|---|---|---|
| CN | 2633070 | 8/2004 |
| CN | 2855178 | 1/2007 |

(Continued)

OTHER PUBLICATIONS https://www.kickstarter.com/projects/phorce/phorce-the-worlds-first-smart-bag; "Phorce: The World's First Smart Bag"; 14 pages.

(Continued)

*Primary Examiner* — David V Henze-Gongola
(74) *Attorney, Agent, or Firm* — Wall & Tong LLP (57) ABSTRACT

Examples relate to a smart bag for charging a set of electronic devices. An example smart bag may comprise a set of power sources integral to the smart bag, where the set of power sources may comprise multiple power sources. The example smart bag may also comprise a power management engine that manages provision of power from each of the set of power sources to a first electronic device.

20 Claims, 6 Drawing Sheets

(56) References Cited

U.S. PATENT DOCUMENTS

| | | | |
|---|---|---|---|
| 2007/0182367 A1* | 8/2007 | Partovi | H01F 5/003 |
| | | | 320/108 |
| 2008/0110537 A1 | 5/2008 | Marmaropoulos et al. | |
| 2009/0179493 A1 | 7/2009 | Yeh | |
| 2010/0295376 A1* | 11/2010 | Black | H02J 7/0068 |
| | | | 307/80 |
| 2011/0215767 A1* | 9/2011 | Johnson | H02J 7/00 |
| | | | 320/136 |
| 2011/0260556 A1 | 10/2011 | Partridge et al. | |
| 2012/0077552 A1 | 3/2012 | Bessa et al. | |
| 2012/0262117 A1 | 10/2012 | Ferber et al. | |
| 2012/0319652 A1* | 12/2012 | Namou | H02J 1/108 |
| | | | 320/116 |
| 2013/0249479 A1 | 9/2013 | Partovi | |
| 2013/0297844 A1* | 11/2013 | Rosenberg | G06F 1/1632 |
| | | | 710/303 |
| 2014/0000771 A1 | 1/2014 | Sherman et al. | |
| 2014/0191568 A1 | 7/2014 | Partovi | |
| 2014/0274204 A1 | 9/2014 | Williams et al. | |

FOREIGN PATENT DOCUMENTS

| | | |
|---|---|---|
| CN | 201328472 | 10/2009 |
| CN | 201360669 | 12/2009 |
| CN | 102769309 A | 11/2012 |
| CN | 203194822 | 9/2013 |
| CN | 203218923 U | 9/2013 |
| TW | M410495 | 9/2011 |
| TW | M426145 | 4/2012 |
| TW | M442751 | 12/2012 |
| WO | WO-2014073971 A1 | 5/2014 |

OTHER PUBLICATIONS

Phorce, "The New Generation Apple IPAD Case: Phorce," (Web Page), retrieved on Mar. 4, 2015, 1 page, available at http://phorce.com/apple-ipad-case/.

* cited by examiner

```
900 RECOGNIZE, BY POWER MANAGEMENT COMPONENT OF THE BAG, A
FIRST ELECTRONIC DEVICE
                            ↓
910 PROVIDE, BASED ON INFORMATION FROM THE POWER MANAGEMENT
COMPONENT, POWER FROM A FIRST POWER SOURCE INTEGRAL TO THE BAG
TO THE FIRST ELECTRONIC DEVICE
                            ↓
920 DEPICT, ON AN EXTERNAL DISPLAY OF THE SMART BAG, INFORMATION
RELATED TO THE FIRST ELECTRONIC DEVICE
```

FIG. 10

```
1000 RECOGNIZE, BY POWER MANAGEMENT COMPONENT OF THE BAG, A SET
OF ELECTRONIC DEVICES
                            ↓
1010 PROVIDE, BASED ON INFORMATION FROM THE POWER MANAGEMENT
COMPONENT, POWER FROM A SET OF POWER SOURCES INTEGRAL TO THE
BAG TO THE SET OF ELECTRONIC DEVICES
                            ↓
1020 DEPICT, ON AN EXTERNAL DISPLAY OF THE SMART BAG, INFORMATION
RELATED TO THE SET OF ELECTRONIC DEVICES
```

SMART BAG

CROSS-REFERENCE TO RELATED APPLICATIONS

This application is a continuation of U.S. patent application Ser. No. 15/522,494, filed on Apr. 27, 2017, which is a 371(c) National Phase Application of International Application No. PCT/2015/012959, filed Jan. 26, 2015, both of which are herein incorporated by reference in their entireties.

BACKGROUND

Individuals carry multiple devices that may require charging during the day. These devices may be charged via USB connection, via connection to a wall-mounted plug, via induction charging, and/or via other methods of providing power to a device.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

Individuals carry multiple devices during the day that may require charging. For example, an individual may carry one or more phones for individual and work purposes, a laptop, a tablet, a camera, and/or other devices that require recharging. These devices may be charged via USB connection, via connection to a wall-mounted plug, via induction charging, and/or via other methods of providing power to a device.

With all of these devices at varying power levels, an individual may have to charge one or more devices at a time, at various locations during the day, to ensure that the devices are available when the individual desires to use them. As such, an individual may always be looking to see where to plug in a device for charging.

To address this issue, a smart bag may provide charging capabilities by which an individual may charge some or all of his devices. The smart bag may comprise a set of power sources integral to the smart bag, from which power may be provided to one or more devices in the bag. The power sources may comprise, for example, a power cord, a solar panel, a battery pack, and/or other power sources that may be integrated into the bag. The bag may also comprise multiple methods by which a device may obtain power from a power source. For example, the bag may comprise a set of USB adaptors (or other physical connectors) to which a device may connect, a set of induction surfaces via which a device may obtain power, a set of adaptors which may provide power wirelessly to a device, and/or other connectors.

The smart bag may also comprise a power management engine (and/or a processor implementing machine-readable instructions, a power management component, or other hardware component capable of implementing the functionality performed by the smart bag). The power management engine may manage the provision of power to a set of devices from the set of power sources integral to the smart bag.

The power management engine may manage, for each individual device disposed in the smart bag, the provision of power from each of the set of power sources to that device. The power management engine may recognize each device disposed in the smart bag and may provide power management responsive to recognizing a device.

The power management engine may manage provision of power from each of the set of power sources based on a set of factors related to power management. The set of factors may comprise, for example, a comparison of a respective amount of power available from each of the set of power sources, a minimum amount of power needed to be available at a respective power source, whether a power source is obtaining power from an external source, and/or other factors. The power management engine may also facilitate provision of power from one power source in the smart bag to another power source.

In some examples, the power management engine may consider the factors in an ordered priority. The ordered priority may be stored, for example, in a non-transitory machine readable storage medium integral to the smart bag. The ordered priority may comprise information related to an order in which factors are considered. For example, the ordered priority may comprise information detailing that a factor of external power being received is considered before a factor of comparing respective amounts of power available at each of the set of power sources.

The smart bag may also comprise an external display integral to the smart bag. The display may show information from the set of electronic devices. For example, the display may show information related to the power available on each of the set of electronic devices, which power sources are providing power to which devices, information provided by an application running on an individual device, information provided by a first application running on a first device and information provided by a second application running on a second device, and/or other information.

Figure 1:
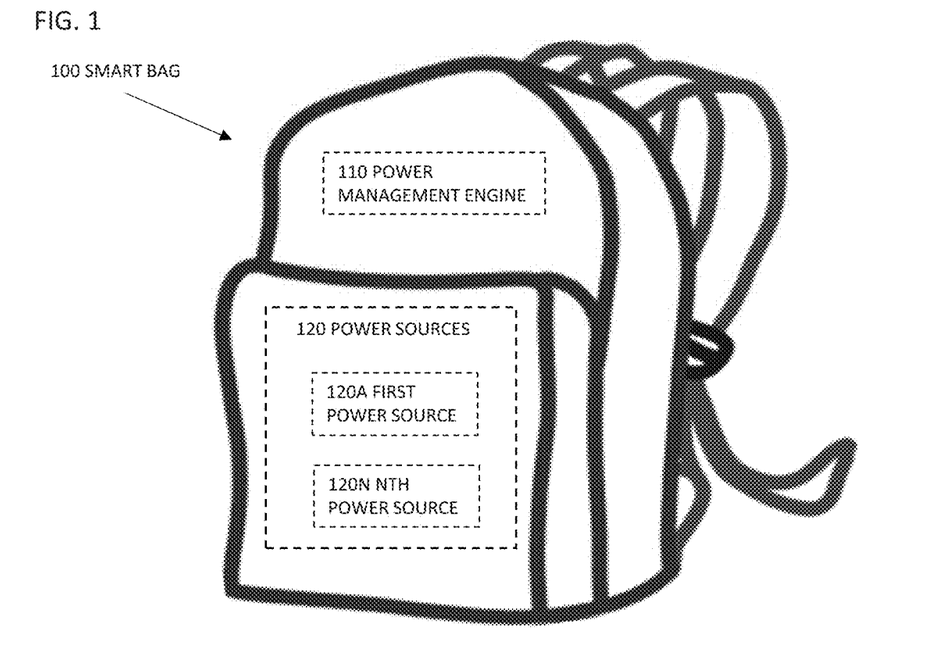
FIG. 1 is a depiction of an example smart bag for charging a set of devices.

Referring now to the drawings, FIG. 1 is a block diagram of an example smart bag 100 for charging a set of devices. The smart bag 100 may comprise a book bag, purse, laptop bag, duffel bag, messenger bag, suitcase, or any other carrier suitable for executing the functionality described below. In the example depicted in FIG. 1, smart bag 100 includes a power management engine 110 and a set of power sources 120.

As detailed below, smart bag 100 may include a set of engines (e.g., power management 110) for charging a set of devices. Each of the engines may generally represent any combination of hardware and programming. For example, the programming for the engines may be processor executable instructions stored on a non-transitory machine-readable storage medium and the hardware for the engines may include at least one processor of the smart bag 100 to execute those instructions. In addition or as an alternative, each engine may include one or more hardware devices including electronic circuitry for implementing the functionality described below.

Figure 2:
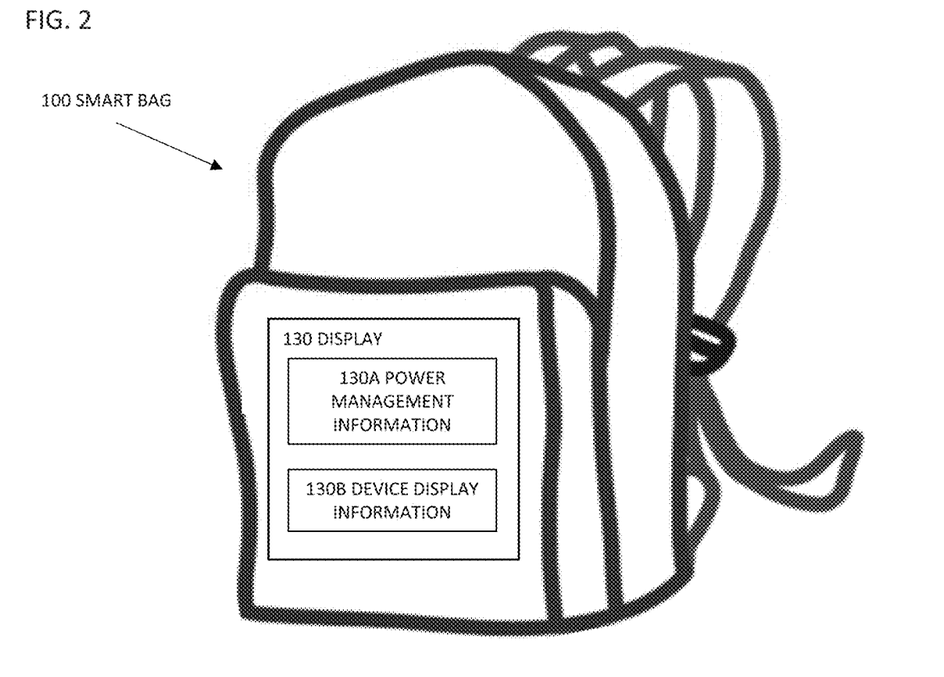
FIG. 2 is a depiction of an example smart bag for charging a set of devices.

In some examples, as shown in FIG. 2, smart bag 100 may also comprise an external display, a set of connectors via which power may be provided to the set of devices, and/or other components that may be used in managing the provision of power to the set of devices.

The processor of smart bag 100 may be one or more central processing units (CPUs), microprocessors, and/or other hardware devices suitable for retrieval and execution of instructions stored in a machine-readable storage medium. The processor may fetch, decode, and execute program instructions to charge a set of devices, as described below. As an alternative or in addition to retrieving and executing instructions, the processor may include one or more electronic circuits comprising a number of electronic components for performing the functionality of instructions stored in the machine-readable storage medium.

In one example, the instructions can be part of an installation package that can be executed by the processor to implement the functionality described herein. In this case, the machine-readable storage medium may be a portable medium such as a CD, DVD, or flash drive or a memory maintained by a computing device from which the installation package can be downloaded and installed. In another example, the program instructions may be part of an application or applications already installed on smart bag 100.

The machine-readable storage medium may be any hardware storage device for maintaining data accessible to smart bag 100. For example, the machine-readable storage medium may include one or more hard disk drives, solid state drives, tape drives, and/or any other storage devices. The storage devices may be located in smart bag 100 and/or in another device in communication with smart bag 100. For example, the machine-readable storage medium may be any electronic, magnetic, optical, or other physical storage device that stores executable instructions. Thus, the machine-readable storage medium may be, for example, Random Access Memory (RAM), an Electrically-Erasable Programmable Read-Only Memory (EEPROM), a storage drive, an optical disc, and the like. As described in detail below, the machine-readable storage medium may be encoded with executable instructions for charging a set of devices. As detailed below, the machine-readable storage medium may maintain and/or store the data and information described herein.

Smart bag 100 may also comprise a set of power sources 120a, 120b, . . . , 120n. The power sources may be integrated into the bag in a manner appropriate for the power source. Power sources 120a, 120b, . . . , 120n may include a set of power cords, a set of solar panels, a set of battery packs, and/or any other power sources that may be integrated into smart bag 100. The power sources 120 of smart bag 100 are not limited to the examples described herein. In some examples, the smart bag 100 may also comprise power connectors that may be coupled to a device. A power connector may comprise, for example, a USB port, another power connector, an induction surface, an adaptor that may provide power wirelessly (e.g., over wifi, via RFID technology, near-field communications, Bluetooth, over a local area network, and/or other wireless protocol), and/or other type of connector that may be operably coupled to a device to provide power. An individual power connector may also be operably coupled to a power source in a wired or wireless manner.

As mentioned above, smart bag 100 may also comprise a power management engine 110. The power management engine 110 may manage the provision of power to a set of devices from the set of power sources 120a, 120b, . . . 120n integral to the smart bag 100.

The power management engine 110 may recognize each device disposed in the smart bag 100 and may provide power management responsive to recognizing a device. For example, the power management engine 110 may determine that a device disposed in the smart bag 100 responsive to the device being placed in the bag (e.g., based on a weight sensor of the bag). Responsive to determining that a device has been placed in the smart bag 100, the power management engine 100 may attempt to initiate communication with the device using one or several communication protocols available to the smart bag 100 (e.g., via near field communications, WiFi, Bluetooth, a wired connection, and/or other protocols).

In another example, the power management engine 100 may receive information from a user regarding the various devices that may be disposed in the bag. The power management engine 110 may initiate communication with the device using the one or several communication protocols available to the smart bag 100. The power management engine 110 may recognize the device by comparing information obtained during the initiating communication with the information received from the user.

In another example in which such information is not received from a user, the power management engine 110 may initiate communication with the device using the one or several communication protocols available to the smart bag 100 and may obtain information related to the device. The power management engine 110 may compare the obtained information with information stored in the machine-readable storage medium integral to the bag 100. Responsive to a match, the power management engine 110 may recognize the device. Responsive to the obtained information not matching information stored in the machine-readable storage medium, the power management engine 110 may store the obtained information in the machine-readable storage medium.

The information obtained from a device may comprise, for example, one or more of device identifier, battery charge level (e.g., percentage of battery charge available and/or other metric relating to power available at the device), information related to applications running on the device, information related to communication protocols available for the device, and/or other information from the device.

In another example, the power management engine 100 may periodically initiate communication with the devices in the smart bag 100 at predetermined intervals to recognize the devices in the smart bag 100.

The power management engine 110 may manage, for each individual device disposed in the smart bag 100, the provision of power from each of the set of power sources 120a, 120b, . . . 120n to that device. The power management engine 100 may provide power to a single device from a single power source or multiple power sources.

The power management engine 110 may manage provision of power from each of the set of power sources based on a set of factors related to power management. The set of factors may comprise, for example, a comparison of a respective amount of power available from each of the set of power sources, a minimum amount of power needed to be available at a respective power source, whether a power source is obtaining power from an external source, a type of device receiving power, an amount of devices in the smart bag 100, a power level of the device receiving power, a power level of each device in the smart bag, whether a device is operably coupled to a power connector, and/or other factors.

In some examples, the power management engine 110 may consider the factors in an ordered priority. The ordered priority may be stored, for example, in a non-transitory storage readable medium integral to the smart bag 100. The ordered priority may comprise information related to an order in which factors are considered. For example, the ordered priority may comprise information detailing that a factor of external power being received is considered before a factor of comparing respective amounts of power available at each of the set of power sources.

For example, based on one or more of the factors, the ordered priority, and/or other information related to power management, the power management engine 110 may provide power from a first power source 120a to a device based on an amount of power available at the first power source 120a and simultaneously may provide power from a second power source 120b to the device based on a second amount of power available at the second power source 120b. In another example, the power management engine 110 may provide power from the first power source 120a to a device based on an amount of power available at the first power source 120a at a first time and may provide power from a second power source 120b to the device based on a second amount of power available at the second power source 120b at a second time. In yet another example, the power management engine 110 may provide power from the first power source 120a to a device based on an amount of power available at the first power source 120a at a first time and may provide power from a second power source 120b to a second device based on a second amount of power available at the second power source 120b at a second time (or at the first time).

In another example, the power management engine 100 may provide power from a first power source 120a to a device based on a minimum amount of power that may need to be maintained at the first power source 120a. The power management engine 100 may also provide power from a first power source 120a to a device based on the first power source 120a obtaining power from an external source.

In other examples, the power management engine 100 may provide a first amount of power to a first device based on the first device type of the first device and provide a second amount of power different from the first amount to a second device based on the second device having a second device type different from the first device type. The power management engine 100 may also provide power to a device based on a ratio of percentage of power (and/or other power availability metric) of each of the power sources 120 of the smart bag 100.

The factors considered and the ordered priority of factors are not limited to the examples described herein.

The power management engine 110 may also facilitate provision of power from one power source in the smart bag 100 to another power source. The power management engine 110 may manage provision of power from a first power source 120a to a second power source 120b based on a set of conditions. The conditions may comprise, for example, a power source obtaining external power, multiple power sources receiving power, some or all power sources comprising at least a predetermined amount of power available (e.g, based on percentage of power available, and/or other metric), and/or other conditions. In some examples, the power management engine 100 may facilitate the provision of power from a first power source 120a to a second power source 120b responsive to a condition being met. In some of those examples, the power management engine 100 may stop the provision of power responsive to determining that the condition is no longer being met. For example, the power management engine 100 may facilitate the provision of power from a first power source 120a to a second power source 120b responsive to the first power source 120 obtaining power from an external source. The conditions used by the power management engine 110 are not limited to the examples described herein.

In some examples, the machine-readable storage medium integral to the smart bag 100 may store information related to the factors, the ordered priority, the conditions, and/or any other information related to power management.

The smart bag 100 may also comprise an external display 130 integral to the smart bag 100 (as shown in FIG. 2). The display 130 may be an LCD display, an HD display, and/or any other type of display that may be integrated into the bag. The display 130 may comprise touchscreen functionality, one or more physical buttons surrounding or integrated into the display, and/or other interactive components to facilitate user interaction with the display 130. In some examples, the information shown on the display 130 may be customized by the individual using the smart bag 100. For example, the user may interact with the display using interactive components to change the information shown on the display 130.

The display 130 may show information from the set of electronic devices and/or the smart bag 100. For example, the display 130 may show information related to the power available on each of the set of electronic devices, the power available on each of the set of power sources, which power sources are providing power to which devices, information provided by an application running on an individual device, information provided by a set of applications running on each device, and/or other information.

In some examples, the display 130 may show default information. For example, the default information may comprise power management information for the smart bag 100 and each device disposed therein.

In some examples, the information shown on the display 130 may be based on a set of display factors. As such, the display 130 may show default information until a display factor is met. Each display factor may be associated with corresponding display information for display 130.

The display factors may comprise, for example, a number of devices disposed in the smart bag 100, presence of a type of device disposed in the smart bag 100, a device running a particular application, an amount of power available at a device, an amount of power available at a power source, any combination thereof, and/or other display factors. The respective display information may comprise, for example, information/power information about each device disposed in the smart bag 100, information from an application running on the device, power management information related to the device, power management information related to the power sources of the smart bag 100, and/or other display information. The display factors, display information, and their correspondence are not limited to the examples described herein.

In some examples, the display 130 (and/or the power management engine 130, processor of the smart bag 100, and/or other component that may execute functionality to facilitate showing information on the display 130) may consider the display factors in an ordered priority. The ordered priority may comprise information related to an order in which the display factors are considered. For example, the order may comprise presence of certain type of device, a number of devices in the smart bag 100, an amount of power available at a device, and/or other display factors.

The machine-readable storage medium of the smart bag 100 may store the display factors, the corresponding display information, the ordered priority of display factors, and/or other information related to the display 130.

Figure 3:
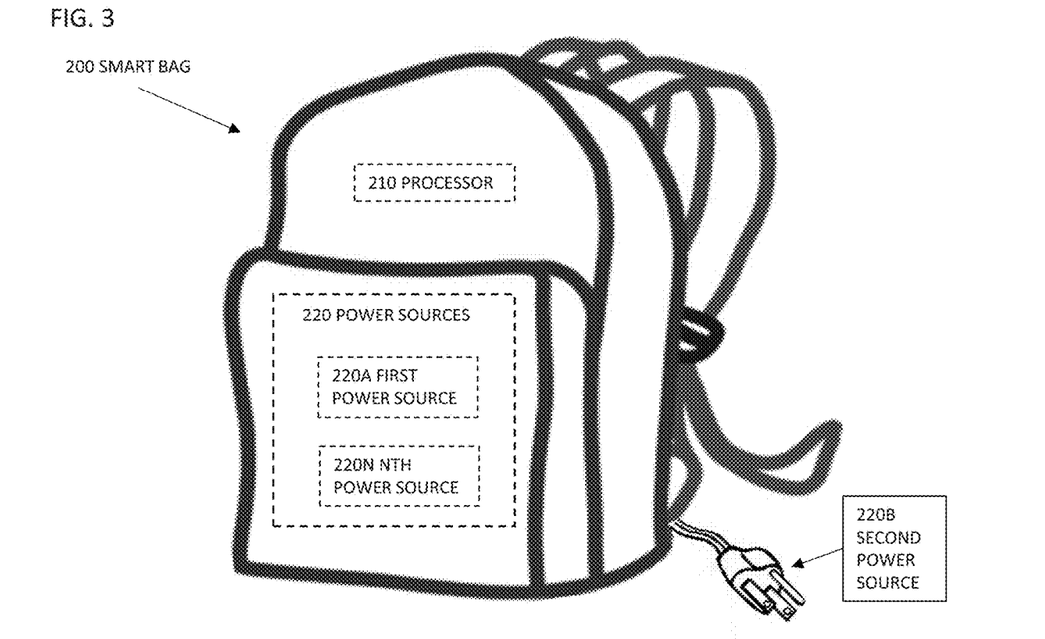
FIG. 3 is a depiction of an example smart bag for charging a set of devices.
Figure 4:
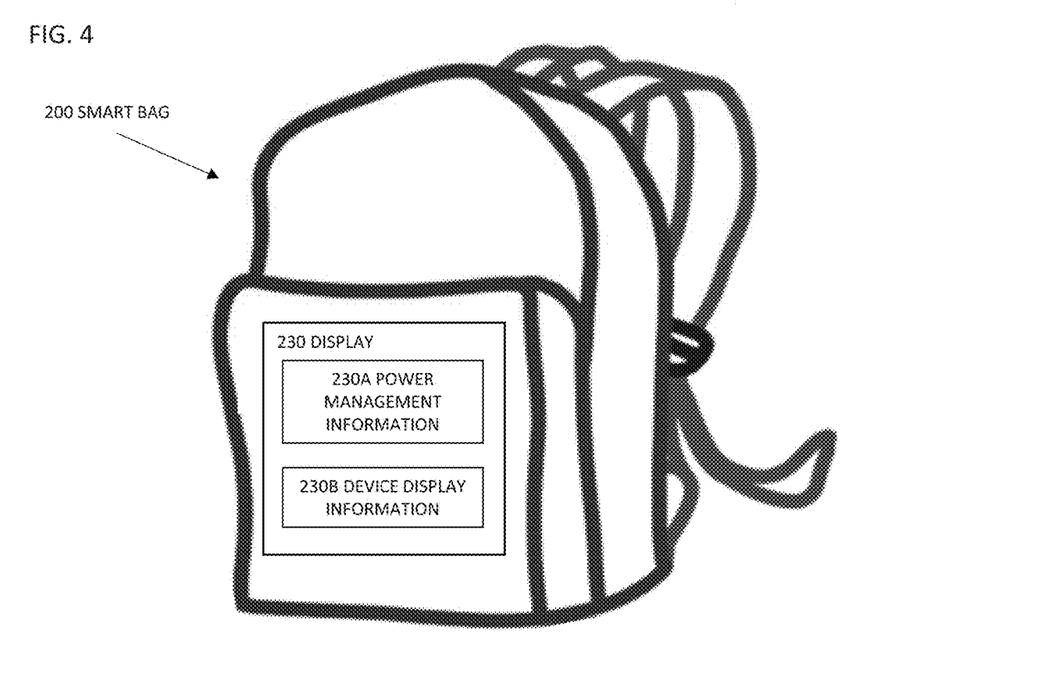
FIG. 4 is a depiction of an example smart bag for charging a set of devices.

FIGS. 3 and 4 depict an example smart bag 200 for charging a set of devices. As with smart bag 100, smart bag 200 may comprise a book bag, purse, laptop bag, duffel bag, messenger bag, suitcase, or any other carrier suitable for executing the functionality described below. Smart bag 200 may comprise a processor 210, a set of power sources 220, a display 230, a machine-readable storage medium, and/or other components. As with the processor of smart bag 100, processor 210 may be one or more CPUs, microprocessors, and/or other hardware devices suitable for retrieval and execution of instructions. As with the storage medium of smart bag 100, the machine-readable storage medium of smart bag 200 may be any hardware storage device for maintaining data accessible to smart bag 200 and may comprise information similar to that stored in the machine-readable storage medium of smart bag 100.

The processor 210 of smart bag 200 may execute computer readable instructions stored in the machine-readable storage medium integral to smart bag 200. The processor 210 may execute the computer readable instructions to perform functionality the same as or similar to the functionality performed by the power management engine 110 and/or other components of the smart bag 100.

As with the display 130 of smart bag 100, display 230 may display information similar or the same as the information displayed on display 130. For example, display 230 may display information related to the power management of the smart bag 200 and/or any devices disposed therein, information from one or several applications running on a first device, information from one or several applications running on the set of devices, any combination thereof, and/or other information related to the smart bag 200 or devices disposed therein.

Figure 5:
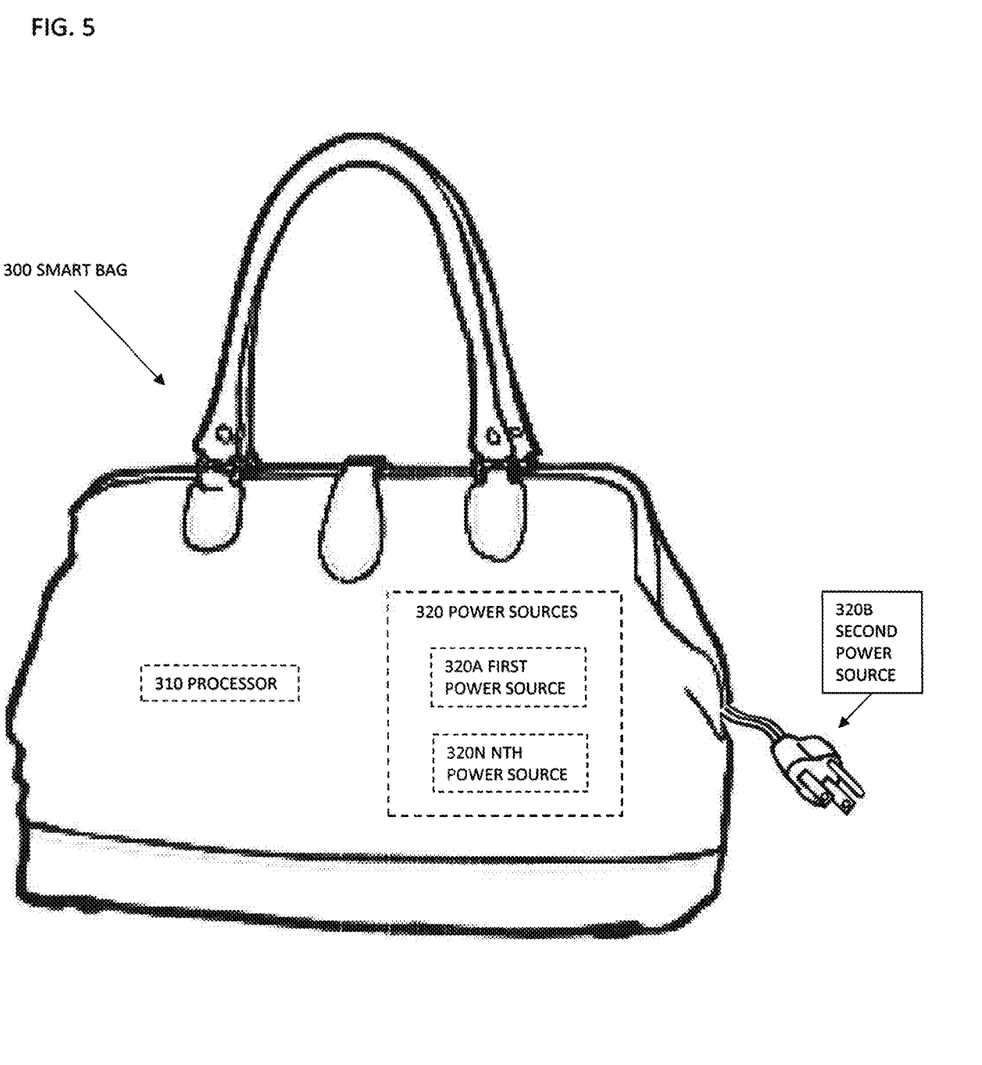
FIG. 5 is a depiction of an example smart bag for charging a set of devices.
Figure 6:
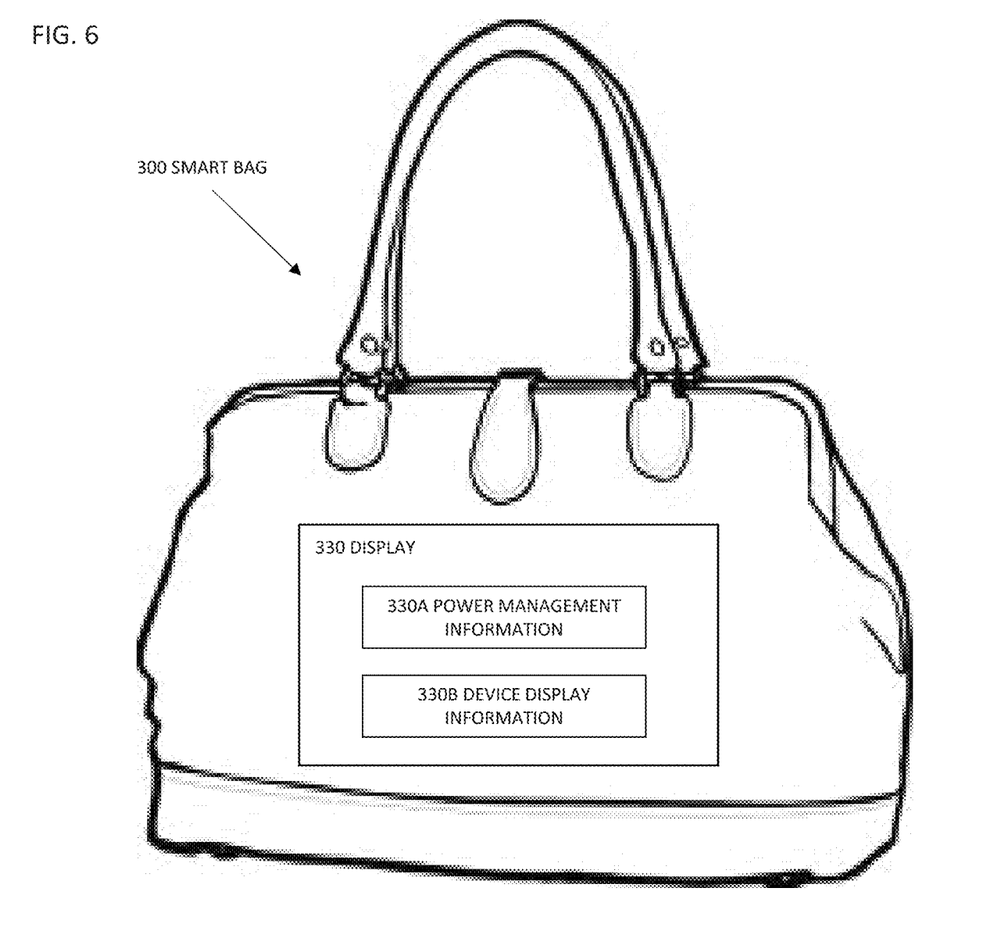
FIG. 6 is a depiction of an example smart bag for charging a set of devices.

FIGS. 5 and 6 are depictions of an example smart bag 300 for charging a set of devices. The example smart bag 300 depicted in FIGS. 5 and 6 may comprise a book bag, purse, laptop bag, duffel bag, messenger bag, suitcase, or any other carrier suitable for executing the functionality described below. Smart bag 300 may also comprise a set of hardware components the same as or similar to smart bags 100 and 200. As with processor 210 of FIG. 3, processor 310 may be one or more CPUs, microprocessors, and/or other hardware devices suitable for retrieval and execution of instructions. Also similar to processor 210 of FIG. 3, processor 310 may execute machine readable-instructions to perform functionality the same as or similar to the functionality performed by processor 210, power management engine 110 of FIG. 1, and/or other functionality performed by smart bag 100 or smart bag 200. As with the storage mediums of smart bags 100 and/or 200, machine-readable storage medium of FIG. 5 may be any hardware storage device for maintaining data accessible to smart bag 300 and may comprise information similar to that stored in storage medium of smart bags 100 and/or 200.

The display 330 of smart bag 300 may comprise similar hardware components as the display 130 of smart bag 100 and display 230 of smart bag 200. The display 330 of smart bag may also display information similar or the same as the information displayed by smart bags 100 and/or 200. In some examples, display 330 may facilitate display of power management information 330a, device display information 330b, and/or other information related to the smart bag 300 and/or devices disposed therein.

Figure 7:
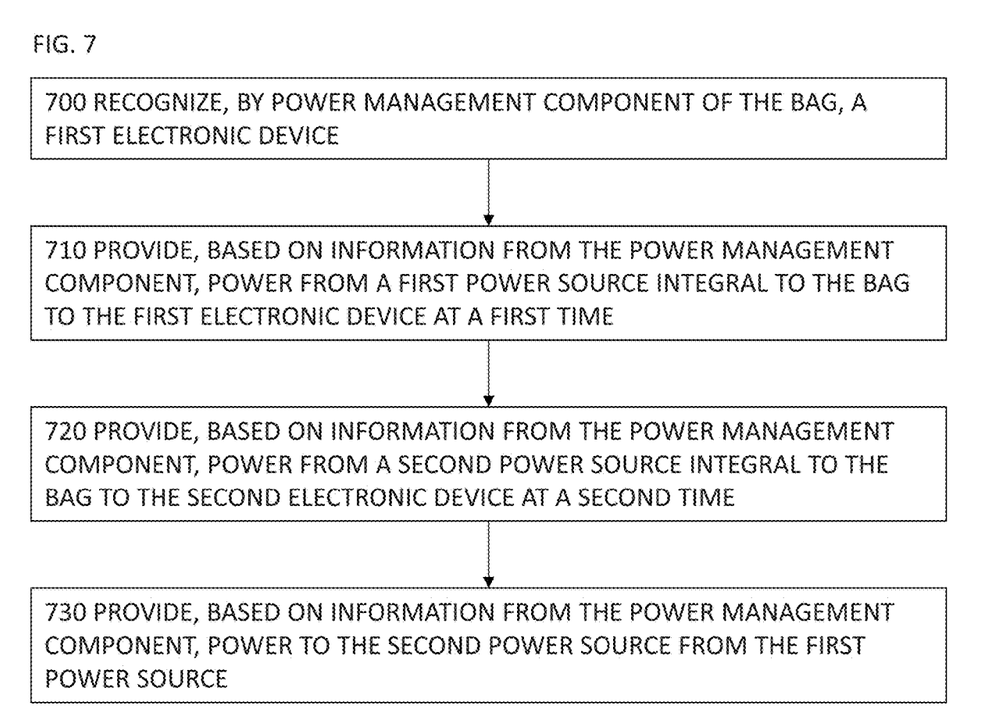
FIG. 7 is a flowchart of an example method for execution by a smart bag for charging a set of devices.

FIG. 7 is a flowchart of an example method for execution by a smart bag for charging a set of devices.

Although execution of the method described below is with reference to smart bag 100 of FIGS. 1 and 2, other suitable devices for execution of this method will be apparent to those of skill in the art (e.g., smart bag 200, smart bag 300, and/or other devices). The method described in FIG. 7 and other figures may be implemented in the form of executable instructions stored on a machine-readable storage medium, by one or more engines described herein, and/or in the form of electronic circuitry.

In an operation 700, a power management component of the smart bag may recognize a first electronic device. The power management component may comprise, for example, the power management engine 110 of smart bag 100, the processor 210 of smart bag 200, the processor of smart bag 300, and/or other hardware component capable of performing the functionality described herein. For example, the smart bag 100 (and/or the power management engine 110, processor, or other resource of the smart bag 100) may recognize the first electronic device. The smart bag 100 may recognize the first electronic device in a manner similar or the same as that described above in relation to the execution of the power management engine 110, processor, or other resource of the smart bag 100.

In an operation 710, power may be provided from a first power source integral to the bag to the first electronic device at a first time, based on information from the power management component. For example, the smart bag 300 (and/or the power management engine 110, processor, or other resource of the smart bag 100) may provide power from the first power source to the first electronic device. The smart bag 100 may provide power from the first power source to the first electronic device in a manner similar or the same as that described above in relation to the execution of the power management engine 110, processor, or other resource of the smart bag 100.

In an operation 720, power may be provided from a second power source integral to the bag to the second electronic device at a second time, based on information from the power management component. For example, the smart bag 100 (and/or the power management engine 110, processor, or other resource of the smart bag 100) may provide power from the second power source to the second electronic device. The smart bag 100 may provide power from the second power source to the second electronic device in a manner similar or the same as that described above in relation to the execution of the power management engine 110, processor, or other resource of the smart bag 100.

In an operation 730, power may be provided to the second power source from the first power source, based on information from the power management component. For example, the smart bag 100 (and/or the power management engine 110, processor, or other resource of the smart bag 100) may provide power from the first power source to the second power source. The smart bag 100 may provide power from the first power source to the second power source in a manner similar or the same as that described above in relation to the execution of the power management engine 110, processor, or other resource of the smart bag 100.

Figure 8:
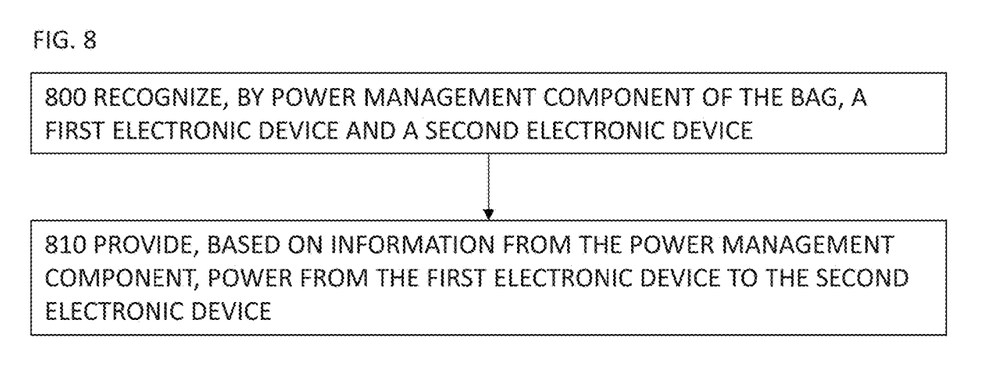
FIG. 8 is a flowchart of an example method for execution by a smart bag for charging a set of devices.

FIG. 8 is a flowchart of an example method for execution by a smart bag for charging a set of devices.

In an operation 800, a first electronic device and a second electronic device may be recognized by a power management component of the smart bag. For example, the smart bag 100 (and/or the power management engine 110, processor, or other resource of the smart bag 100) may recognize the first electronic device and the second electronic device. The smart bag 100 may recognize the first electronic device and the second electronic device in a manner similar or the same as that described above in relation to the execution of the power management engine 110, processor, or other resource of the smart bag 100.

In an operation 810, power may be provided from the first electronic device to the second electronic device, based on information from the power management component. For example, the smart bag 100 (and/or the power management engine 110, processor, or other resource of the smart bag 100) may provide power from the first electronic device to the second electronic device. The smart bag 100 may provide power from the first electronic device to the second electronic device in a manner similar or the same as that described above in relation to the execution of the power management engine 110, processor, or other resource of the smart bag 100.

Figure 9:
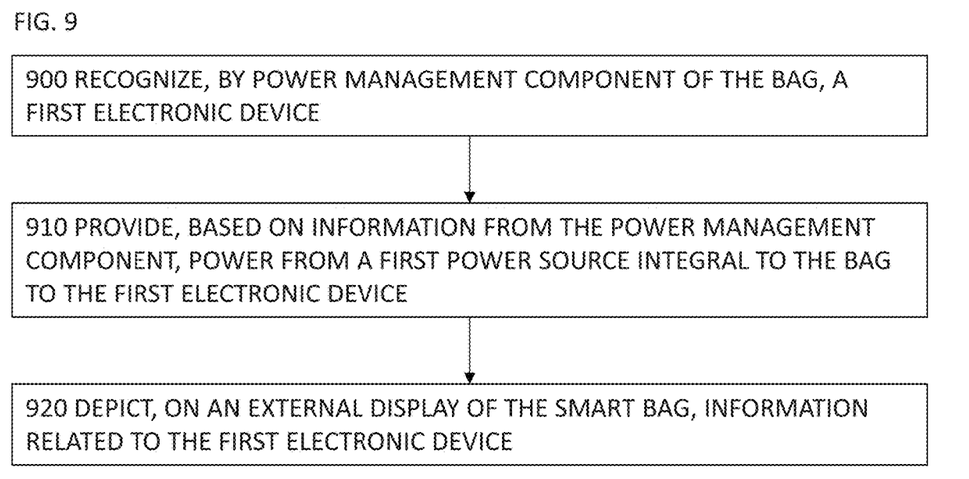
FIG. 9 is a flowchart of an example method for execution by a smart bag for displaying information from a set of devices.

FIG. 9 is a flowchart of an example method for execution by a smart bag for charging a set of devices.

In an operation 900, a first electronic device may be recognized by a power management component of the smart bag. For example, the smart bag 100 (and/or the power management engine 110, processor, or other resource of the smart bag 100) may recognize the first electronic device. The smart bag 100 may recognize the first electronic device in a manner similar or the same as that described above in relation to the execution of the power management engine 110, processor, or other resource of the smart bag 100.

In an operation 910, power may be provided from a first power source integral to the bag to the first electronic device at a first time, based on information from the power management component. For example, the smart bag 100 (and/or the power management engine 110, processor, or other resource of the smart bag 100) may provide power from the first power source to the first electronic device. The smart bag 100 may provide power from the first power source to the first electronic device in a manner similar or the same as that described above in relation to the execution of the power management engine 110, processor, or other resource of the smart bag 100.

In an operation 920, information related to the first electronic device may be displayed on an external display of the bag. For example, the smart bag 100 (and/or the power management engine 110, processor, display 130, or other resource of the smart bag 100) may facilitate the display of information related to the first electronic device on the external display of the smart bag. The smart bag 100 may facilitate the display of information related to the first electronic device on the external display of the smart bag in a manner similar or the same as that described above in relation to the execution of the power management engine 110, processor, display 130, or other resource of the smart bag 100.

Figure 10:
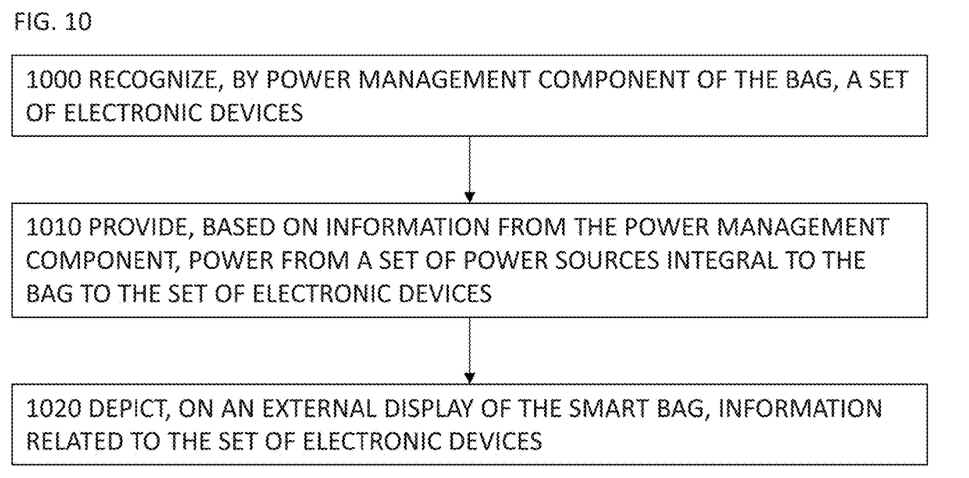
FIG. 10 is a flowchart of an example method for execution by a smart bag for displaying information from a set of devices.

FIG. 10 is a flowchart of an example method for execution by a smart bag for charging a set of devices.

In an operation 1000, a set of electronic devices may be recognized by a power management component of the smart bag. For example, the smart bag 100 (and/or the power management engine 110, processor, or other resource of the smart bag 100) may recognize the set of electronic devices. The smart bag 100 may recognize the set of electronic devices in a manner similar or the same as that described above in relation to the execution of the power management engine 110, processor, or other resource of the smart bag 100.

In an operation 1010, power may be provided from a set of power sources integral to the bag to the set of electronic devices, based on information from the power management component. For example, the smart bag 300 (and/or the power management engine 110, processor, or other resource of the smart bag 100) may provide power from the set of power sources to the set of electronic devices. The smart bag 300 may provide power from the set of power sources to the set of electronic devices in a manner similar or the same as that described above in relation to the execution of the power management engine 110, processor, or other resource of the smart bag 100.

In an operation 1020, information related to the set of electronic devices may be displayed on an external display of the bag. For example, the smart bag 100 (and/or the power management engine 110, processor, display 130, and/or other resource of the smart bag 100) may facilitate the display of information related to the set of electronic devices on the external display of the smart bag. The smart bag 100 may facilitate the display of information related to the set of electronic devices on the external display of the smart bag in a manner similar or the same as that described above in relation to the execution of the power management engine 110, processor, display 130 or other resource of the smart bag 100.

The foregoing disclosure describes a number of examples of a smart bag for charging a set of devices. The disclosed examples of types of smart bags may include book bags, purses, laptop bags, duffel bag, messenger bags, and/or other types of smart bags for charging a set of devices. For purposes of explanation, certain examples are described with reference to the components illustrated in FIGS. 1-10. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-10 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

All such modifications and variations are intended to be included within the scope of this disclosure and protected by the following claims.

We claim:
1. A smart bag, comprising:
a plurality of power sources integral to the smart bag;
a power management engine to:
initiate a communication with the first electronic device to obtain electronic device information from the first electronic device; and
manage provisioning of power from the plurality of power sources to the first electronic device based on the electronic device information; and
a display to:
display default information until, when considered in an ordered priority, a display factor of a plurality of display factors is met to display information from the first electronic device, wherein the plurality of display factors comprises a device classification and an amount of power available on the first electronic device.

2. The smart bag of claim 1, wherein the power management engine:
manages provision of power from each of the plurality of power sources based on a respective amount of power available from the plurality of power sources; and
provides power to the first electronic device from a first power source and a second power source based on a first amount of power available from the first power source and a second amount of power available from the second power source.

3. The smart bag of claim 2,
wherein the first power source comprises a battery pack integral to the smart bag, and
wherein the power management engine determines an amount of power to provide from the first power source based on a minimum amount of power needed to be available at the first power source.

4. The smart bag of claim 2,
wherein the second power source is one of a power cord or a solar panel, and
wherein the power management engine determines an amount of power to provide from the second power source based on whether the second power source is obtaining external power.

5. The smart bag of claim 4, wherein the power management engine provides power from the second power source to the first power source responsive to the second power source obtaining external power.

6. The smart bag of claim 1, wherein the first electronic device provides power to a second electronic device based on information from the power management component.

7. The smart bag of claim 1, wherein the display displays information provided by an application running on the first electronic device.

8. A smart bag, comprising:
a processor;
a memory resource comprising machine-readable instructions, when executed, cause the processor to:
detect that the first electronic device is placed in the smart bag;
initiate a communication with the first electronic device in response to the first electronic device being detected to obtain device information of the first electronic device;
manage providing power from a plurality of power sources to the first electronic device based on the electronic device information; and
a display to display default information until a display factor of a plurality of display factors is met to display information from the first electronic device, wherein the plurality of display factors are considered in an ordered priority, wherein the plurality of display factors comprises a device classification and an amount of power available on the first electronic device.

9. The smart bag of claim 8, wherein the machine-readable instructions cause the processor to:
manage providing power based on a power availability metric available from each power source in the plurality of power sources.

10. The smart bag of claim 9, wherein the machine-readable instructions executed by the processor cause the processor to:
manage providing power from a second power source to a first power source, wherein the plurality of power sources comprise a battery pack, a solar panel, and a power cord.

11. The smart bag of claim 8, wherein the machine-readable instructions executed by the processor cause the processor to:
determine an amount of power to provide from the first power source based on a minimum amount of power needed to be available at the first power source.

12. The smart bag of claim 8, wherein the machine-readable instructions executed by the processor cause the processor to:
determine an amount of power to provide from the second power source based on whether the second power source is obtaining external power.

13. The smart bag of claim 8, wherein the display displays information provided by a first application running on the first electronic device and information provided by a second application running on a second electronic device.

14. The smart bag of claim 8, wherein the machine-readable instructions executed by the processor cause the processor to:
recognize the first electronic device based on a comparison between information obtained from the communication with the first electronic device and information received from a user regarding various devices disposed in the bag.

15. The smart bag of claim 8, wherein the plurality of power sources comprise multiple power sources integral to the smart bag.

16. The smart bag of claim 8, wherein the machine-readable instructions executed by the processor cause the processor to:
periodically initiate communications with devices in the smart bag to detect the first electronic device.

17. A method for charging electronic devices, the method comprising:
initiating, by a power management component of a smart bag, a first communication with a first electronic device placed in the smart bag to obtain a first electronic device information;
recognizing, by the power management component of the smart bag, the first electronic device based on the first electronic device information;
providing, based on the first electronic device information, power from a first power source integral to the smart bag to the first electronic device at a first time;

initiating, by the power management component of the smart bag, a second communication with a second electronic device placed in the smart bag to obtain a second electronic device information;

recognizing, by the power management component of the smart bag, the second electronic device based on the second electronic device information;

providing, based on the second electronic device information, power from a second power source integral to the smart bag to the second electronic device at a second time;

determining, by a processor of the smart bag, respective device display information of the first electronic device and the second electronic device based on an ordered priority of a plurality of display factors, the display factors comprising a device classification and an amount of power available on the first electronic device and on the second electronic device; and displaying, on a display of the smart bag, default information until a display factor of a plurality of display factors is met to display information from the first electronic device and the second electronic device.

18. The method of claim 17, further comprising:

managing, by the power management component, provision of power from each of the set of power sources based on a respective amount of power available from a plurality of power sources;

providing, by the power management component, power to the first electronic device from the first power source and the second power source based on a first amount of power available from the first power source and a second amount of power available from the second power source, wherein the first power source comprises a battery pack integral to the smart bag, the second power source comprises a power cord integral to the smart bag, and wherein the plurality of power sources comprises a third power source, the third power source comprising a solar panel integral to the smart bag.

19. The method of claim 17, further comprising:

managing, by the power management component, provision of power from each of the plurality of power sources based on an ordered priority of a plurality of factors related to power management.

20. The method of claim 17, further comprising:

receiving information regarding various devices disposed in the bag; and comparing information obtained from the first communication with the first electronic device and the second communication with the second electronic device to the information that is received to recognize the first electronic device and the second electronic device.

* * * * *